US007490287B2

(12) United States Patent
Sakurai

(10) Patent No.: US 7,490,287 B2
(45) Date of Patent: Feb. 10, 2009

(54) TIME SERIES DATA ANALYSIS APPARATUS AND METHOD

(75) Inventor: Shigeaki Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 11/100,512

(22) Filed: Apr. 7, 2005

(65) Prior Publication Data

US 2005/0246161 A1 Nov. 3, 2005

(30) Foreign Application Priority Data

Apr. 28, 2004 (JP) ............................ P2004-133576

(51) Int. Cl.
*G06F 17/00* (2006.01)

(52) U.S. Cl. ..................................... 715/200
(58) Field of Classification Search ................ 715/200, 715/255, 256
See application file for complete search history.

(56) References Cited

U.S. PATENT DOCUMENTS

| | | | | |
|---|---|---|---|---|
| 5,680,864 A * | 10/1997 | Morgan et al. | ............... | 600/518 |
| 5,742,811 A | 4/1998 | Agrawal et al. | | |
| 6,006,223 A | 12/1999 | Agrawal et al. | | |
| 6,047,299 A * | 4/2000 | Kaijima | ....................... | 715/236 |
| 6,195,103 B1 * | 2/2001 | Stewart | ....................... | 345/440 |
| 6,230,064 B1 * | 5/2001 | Nakase et al. | ................. | 700/90 |
| 6,473,757 B1 | 10/2002 | Garofalakis et al. | | |
| 6,493,713 B1 * | 12/2002 | Kanno | ............................ | 707/6 |
| 6,687,401 B2 * | 2/2004 | Naoi et al. | ................... | 382/190 |
| 6,912,516 B1 * | 6/2005 | Ikeda et al. | .................... | 706/45 |
| 7,152,212 B2 * | 12/2006 | McMahan | .................... | 715/771 |
| 7,225,188 B1 * | 5/2007 | Gai et al. | ......................... | 707/6 |
| 7,240,061 B2 * | 7/2007 | Fukushima et al. | ......... | 707/100 |
| 2002/0134222 A1 * | 9/2002 | Tamura | ....................... | 84/622 |
| 2002/0152474 A1 * | 10/2002 | Dudkiewicz | ................. | 725/136 |
| 2002/0178155 A1 * | 11/2002 | Sakurai | ......................... | 707/3 |
| 2003/0088643 A1 * | 5/2003 | Shupps et al. | ................ | 709/218 |

(Continued)

FOREIGN PATENT DOCUMENTS

JP 2002-183178 6/2002

OTHER PUBLICATIONS

Motoyoshi et al., Mining Temporal Classes from Time Series Data, ACM 2002, pp. 493-498.*
Valente et al., Discovering Similar Patterns in Time Series, ACM 2000, pp. 497-505.*
Keogh et al., On the Need for Time Series Data Mining Benchmarks: A Survey and Empirical Demonstration, Google 2003, pp. 349-371.*

(Continued)

*Primary Examiner*—Cong-Lac Huynh
(74) *Attorney, Agent, or Firm*—Finnegan, Henderson, Farabow, Garrett & Dunner, L.L.P.

(57) ABSTRACT

A text data storage unit stores a plurality of text data having attribute data and time data. A dictionary storage unit stores a plurality of events each associated with text data. An analysis condition indication unit indicates an analysis target as attribute data and an analysis condition as an event sequence. A time series data generation unit assigns an event to each of the plurality of text data by referring to the dictionary storage unit, extracts a group of text data each having the same attribute data as the analysis target from the plurality of text data, and generates time series data each representing the event assigned to the text data of the group in order of the time data of the text data. A time series data analysis unit analyzes the time series data each having the same event sequence as the analysis condition.

18 Claims, 13 Drawing Sheets

U.S. PATENT DOCUMENTS

| | | | |
|---|---|---|---|
| 2003/0113016 A1* | 6/2003 | Naoi et al. | 382/181 |
| 2004/0186835 A1 | 9/2004 | Sakurai | |
| 2004/0210117 A1 | 10/2004 | Ueno et al. | |
| 2005/0286860 A1* | 12/2005 | Conklin | 386/46 |
| 2006/0026688 A1* | 2/2006 | Shah | 726/25 |
| 2006/0080140 A1* | 4/2006 | Buttner et al. | 705/2 |
| 2006/0088214 A1* | 4/2006 | Handley et al. | 382/176 |
| 2007/0112654 A1* | 5/2007 | Garcia et al. | 705/32 |
| 2007/0147519 A1* | 6/2007 | Takayama et al. | 375/246 |

OTHER PUBLICATIONS

Wong et al., Visualizing Sequential Patterns for Text Mining, IEEE 2000, pp. 1-7.*

Srikant, et al., "Mining Sequential Patterns: Generalizations and Performance Improvements", in Proceeding of the 5th International Conference Extending Database Technology, 3-17, (1996).

Sakurai, "Data Analyzer Apparatus and Data Analytical Method", U.S. Appl. No. 10/151,965, filed Nov. 28, 2002.

* cited by examiner

| | | | | BUSINESS BEHAVIOR | | | |
|---|---|---|---|---|---|---|---|
| | | | | CUSTOMER VISIT | OPERATION OF DEMONSTRATION | PRESENTATION OF ESTIMATE | UNOFFICIAL DECISION |
| CUSTOMER NAME | α CORPORATION | PRODUCT NAME | PRODUCT A | 63 | 99 | 10 | 4 |
| | | | PRODUCT B | 34 | 73 | 25 | 12 |
| | | | PRODUCT C | 25 | 86 | 32 | 8 |

FIG. 10

| | | | | (OPERATION OF DEMONSTRATION, CUSTOMER REACTION) | | |
|---|---|---|---|---|---|---|
| | | | | (OPERATION OF DEMONSTRATION, POPULAR) | (OPERATION OF DEMONSTRATION, NORMAL) | (OPERATION OF DEMONSTRATION, UNPOPULAR) |
| CUSTOMER NAME | α CORPORATION | PRODUCT NAME | PRODUCT A | 42 | 5 | 38 |
| | | | PRODUCT B | 48 | 6 | 2 |
| | | | PRODUCT C | 35 | 30 | 13 |

FIG. 11

| | | | | (BUSINESS BEHAVIOR, CUSTOMER REACTION) | | | | | | | | | | | |
|---|---|---|---|---|---|---|---|---|---|---|---|---|---|---|---|
| | | | | (CUSTOMER VISIT, POPULAR) | (CUSTOMER VISIT, NORMAL) | (CUSTOMER VISIT, UNPOPULAR) | (OPERATION OF DEMONSTRATION, POPULAR) | (OPERATION OF DEMONSTRATION, NORMAL) | (OPERATION OF DEMONSTRATION, UNPOPULAR) | (PRESENTATION OF ESTIMATE, POPULAR) | (PRESENTATION OF ESTIMATE, NORMAL) | (PRESENTATION OF ESTIMATE, UNPOPULAR) | (UNOFFICIAL DECISION, POPULAR) | (UNOFFICIAL DECISION, NORMAL) | (UNOFFICIAL DECISION, UNPOPULAR) |
| CUSTOMER NAME | α CORPORATION | PRODUCT NAME | PRODUCT A | 24 | 13 | 17 | 42 | 5 | 38 | 0 | 2 | 6 | 0 | 1 | 0 |
| | | | PRODUCT B | 8 | 14 | 10 | 48 | 6 | 2 | 8 | 7 | 5 | 1 | 0 | 1 |
| | | | PRODUCT C | 3 | 8 | 7 | 35 | 30 | 13 | 13 | 12 | 4 | 0 | 0 | 2 |

FIG. 12

| | | | | CUSTOMER REACTION | | |
|---|---|---|---|---|---|---|
| | | | | POPULAR | NORMAL | UNPOPULAR |
| CUSTOMER NAME | α CORPORATION | PRODUCT NAME | PRODUCT A | 54 | 31 | 42 |
| | | | PRODUCT B | 92 | 25 | 21 |
| | | | PRODUCT C | 70 | 62 | 31 |

FIG. 13

| | | | | (OPERATION OF DEMONSTRATION, POPULAR), SALES RESULT | |
|---|---|---|---|---|---|
| | | | | (OPERATION OF DEMONSTRATION, POPULAR) ORDER - ACCEPTANCE | (OPERATION OF DEMONSTRATION, POPULAR) ORDER - REJECTION |
| CUSTOMER NAME | α CORPORATION | PRODUCT NAME | PRODUCT A | 30 | 1 |
| | | | PRODUCT B | 28 | 5 |
| | | | PRODUCT C | 25 | 3 |

FIG. 14

| | | | | CUSTOMER BEHAVIOR, (OPERATION OF DEMONSTRATION, POPULAR), ORDER - ACCEPTANCE | | |
| --- | --- | --- | --- | --- | --- | --- |
| | | | | SENDING OF PAMPHLET, (OPERATION OF DEMONSTRATION, POPULAR), ORDER - ACCEPTANCE | REQUEST FOR LOWER PRICE, (OPERATION OF DEMONSTRATION, POPULAR), ORDER - ACCEPTANCE | INQUIRY OF SPEC, (OPERATION OF DEMONSTRATION, POPULAR), ORDER - ACCEPTANCE |
| CUSTOMER NAME | α CORPORATION | PRODUCT NAME | PRODUCT A | 15 | 3 | 6 |
| | | | PRODUCT B | 10 | 5 | 1 |
| | | | PRODUCT C | 8 | 7 | 2 |

FIG. 15

| | | | | SENDING OF PAMPHLET, (OPERATION OF DEMONSTRATION, POPULAR), SALES RESULT | |
| --- | --- | --- | --- | --- | --- |
| | | | | SENDING OF PAMPHLET, (OPERATION OF DEMONSTRATION, POPULAR), ORDER - ACCEPTANCE | SENDING OF PAMPHLET, (OPERATION OF DEMONSTRATION, POPULAR), ORDER - REJECTION |
| CUSTOMER NAME | α CORPORATION | PRODUCT NAME | PRODUCT A | 15 | 0 |
| | | | PRODUCT B | 10 | 5 |
| | | | PRODUCT C | 8 | 2 |

FIG. 16

TIME SERIES DATA ANALYSIS APPARATUS AND METHOD

CROSS-REFERENCE TO RELATED APPLICATIONS

This application is based upon and claims the benefit of priority from prior Japanese Patent Application P2004-133576, filed on Apr. 28, 2004; the entire contents of which are incorporated herein by reference.

FIELD OF THE INVENTION

The present invention relates to a time series data analysis apparatus and method for analyzing time series data as a plurality of text data, each time series data having attribute data and time data.

BACKGROUND OF THE INVENTION

In general, text data having time data is called time series data. Examples include business report data recording daily business activity of a business person in a business area, nursing record data recording changes in the condition of a patient and nursing contents for the patient in the medical area, inspection records automatically recorded in a Web server, and Web log data recording contents of Web page in information processing area.

As apparatus for multi-dimensionally analyzing data stored in a database, a software called OLAP (On Line Analytical Processing) is known. Furthermore, an apparatus for realizing function of the OLAP tool is disclosed in Japanese Patent Disclosure (Kokai) P2002-183178 "Device and method for supporting data analysis and storage medium". In this apparatus, data matched with an indicated condition can be set as a group through a visual programming environment, and data in the group can be analyzed. However, the data is only grouped in order to easily execute the count processing. In other words, the data can not be analyzed in time series.

Furthermore, GSP (Generalized Sequence Patterns) algorithm is disclosed in (Ramakrishnan Srikant and Rakesh Agrawal, "Mining Sequential Patterns: generalization and performance Improvements" in Proceeding of the 5th International Conference Extending database Technology, 3-17, 1996). In this algorithm, by previously indicating a criterion based on a frequency of a sequential pattern, characteristic sequential pattern can be found from a sequential data set. However, the sequential pattern is exhaustively found based on the indicated criterion. Accordingly, it takes a long time to find the sequential pattern. In addition to this, if a frequency of a characteristic pattern is slightly below the indicated criterion, the characteristic pattern can not be found. Accordingly, a possibility to miss the characteristic pattern exists.

Briefly, in the time series data analysis apparatus of prior art, data can not be analyzed in time series. Furthermore, in the GSP, it takes a long time to find the sequential pattern because the sequential pattern is exhaustively found based on the indicated criterion.

SUMMARY OF THE INVENTION

The present invention is directed to a time series data analysis apparatus and method for extracting a characteristic pattern from time series data by the user's interactive operation.

According to an aspect of the present invention, there is provided an apparatus for analyzing time series data, comprising: a text data storage unit configured to store a plurality of text data, each text data having attribute data and time data; a dictionary storage unit configured to store a plurality of events each associated with text data; an analysis condition indication unit configured to indicate an analysis target as attribute data and an analysis condition as an event sequence; a time series data generation unit configured to assign an event to each of the plurality of text data by referring to said dictionary storage unit, to extract a group of text data each having the same attribute data as the analysis target from the plurality of text data, and to generate time series data each representing the event assigned to the text data of the group in order of the time data of the text data; a time series data analysis unit configured to analyze the time series data each having the same event sequence as the analysis condition; and an analysis result output unit configured to output an analysis result of said time series data analysis unit.

According to another aspect of the present invention, there is also provided a method for analyzing time series data, comprising: storing a plurality of text data, each text data having attribute data and time data in a text data storage unit; storing a plurality of events each associated with text data in a dictionary storage unit; indicating an analysis target as attribute data and an analysis condition as an event sequence; assigning an event to each of the plurality of text data by referring to said dictionary storage unit; extracting a group of text data each having the same attribute data as the analysis target from the plurality of text data; generating time series data each representing the event assigned to the text data of the group in order of the time data of the text data; analyzing the time series data each having the same event sequence as the analysis condition; and outputting an analysis result of the time series data.

According to still another aspect of the present invention, there is also provided a computer program product, comprising: a computer readable program code embodied in said product for causing a computer to analyze time series data, said computer readable program code comprising: a first program code to store a plurality of text data, each text data having attribute data and time data in a text data storage unit; a second program code to store a plurality of events each associated with text data in a dictionary storage unit; a third program code to indicate an analysis target as attribute data and an analysis condition as an event sequence; a fourth program code to assign an event to each of the plurality of text data by referring to said dictionary storage unit; a fifth program code to extract a group of text data each having the same attribute data as the analysis target from the plurality of text data; a sixth program code to generate time series data each representing the event assigned to the text data of the group in order of the time data of the text data; a seventh program code to analyze the time series data each having the same event sequence as the analysis condition; and an eighth program code to output an analysis result of the time series data.

BRIEF DESCRIPTION OF THE DRAWINGS

FIG. 10 is one example of analysis result of time series data of which attribute data is customer name and product name and sequential data is "business behavior" according to the first embodiment.

FIG. 11 is one example of analysis result of time series data of which attribute data is customer name and product name and sequential data is "(operation of demonstration, customer reaction)" according to the first embodiment.

FIG. 12 is one example of analysis result of time series data of which attribute data is customer name and product name and sequential data is "(business behavior, customer reaction)" according to the first embodiment.

FIG. 13 is one example of analysis result of time series data of which attribute data is customer name and product name and sequential data is "customer reaction" according to the first embodiment.

FIG. 14 is one example of analysis result of time series data of which attribute data is customer name and product name and sequential data is "(operation of demonstration, popular), sales result" according to the first embodiment.

FIG. 15 is one example of analysis result of time series data of which attribute data is customer name and product name and sequential data is "customer behavior, (operation of demonstration, popular), order-acceptance)" according to the first embodiment.

FIG. 16 is one example of analysis result of time series data of which attribute data is customer name and product name and sequential data is "sending of pamphlet, (operation of demonstration, popular), sales result" according to the first embodiment.

DETAILED DESCRIPTION OF THE EMBODIMENTS

Figure 1:
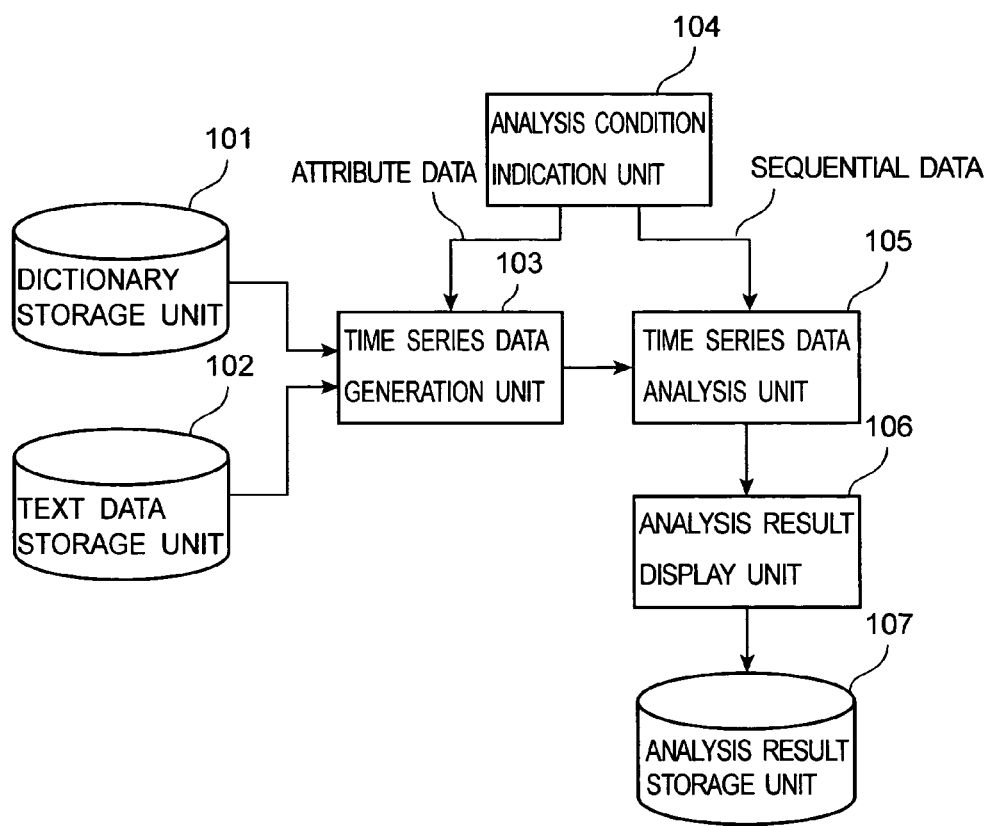
FIG. 1 is a block diagram of a time series data analysis apparatus according to a first embodiment.

Hereinafter, various embodiments will be explained by referring to the drawings. FIG. 1 is a block diagram of the time series data analysis apparatus according to the first embodiment. In FIG. 1, the time series data analysis apparatus includes a dictionary storage unit 101, a text data storage unit 102, a time series data generation unit 103, an analysis condition indication unit 104, a time series data analysis unit 105, an analysis result display unit 106, and an analysis result storage unit 107.

For example, the dictionary storage unit 101 stores background knowledge having a hierarchical structure of three layers as shown in FIGS. 4~7. However, the hierarchical structure is not limited to the three layers.

Figure 4:
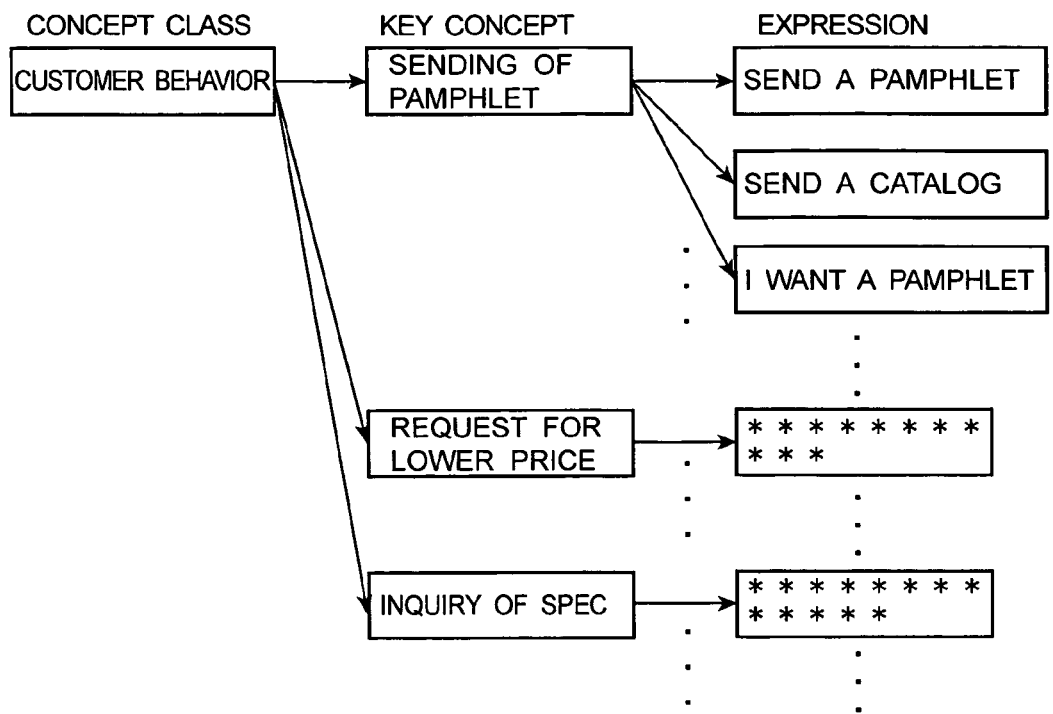
FIG. 4 is one example of background knowledge of customer behavior according to the first embodiment.

FIG. 4 is one example of background knowledge of customer behavior stored in the dictionary storage unit 101. A concept class "customer behavior" links to key concepts "sending of pamphlet", "request for lower price" and "inquiry of specification (spec)" as lower nodes. Furthermore, each key concept links to expressions (characters). For example, if text data includes an expression "send a pamphlet", a key concept "sending of pamphlet" is assigned to the text data.

Figure 5:
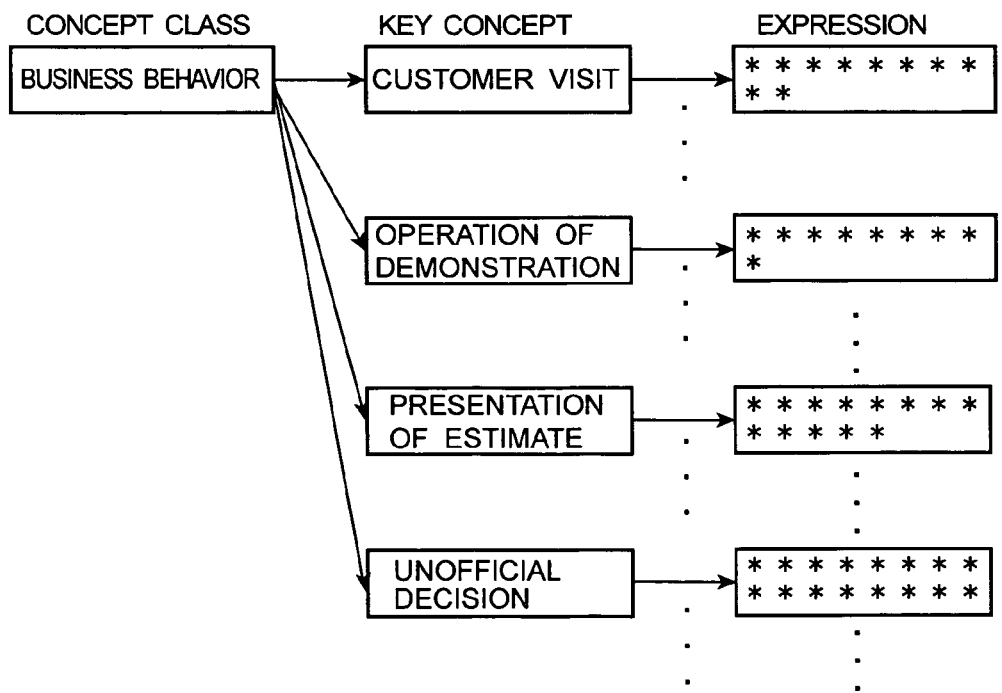
FIG. 5 is one example of background knowledge of business behavior according to the first embodiment.

FIG. 5 is one example of background knowledge of business behavior stored in the dictionary storage unit 101. A concept class "business behavior" links to key concepts "customer visit", "operation of demonstration", "presentation of estimate" and "unofficial decision" as lower nodes. Furthermore, each key concept links to expressions (characters).

Figure 6:
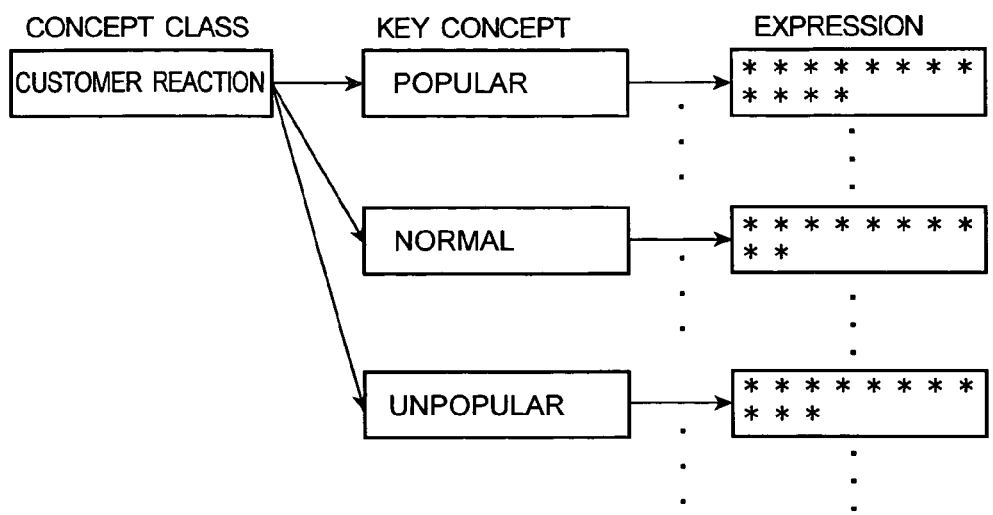
FIG. 6 is one example of background knowledge of customer reaction according to the first embodiment.

FIG. 6 is one example of background knowledge of customer reaction stored in the dictionary storage unit 101. A concept class "customer reaction" links to key concepts "popular", "normal" and "unpopular" as lower nodes. Furthermore, each key concept links to expressions (characters).

Figure 7:
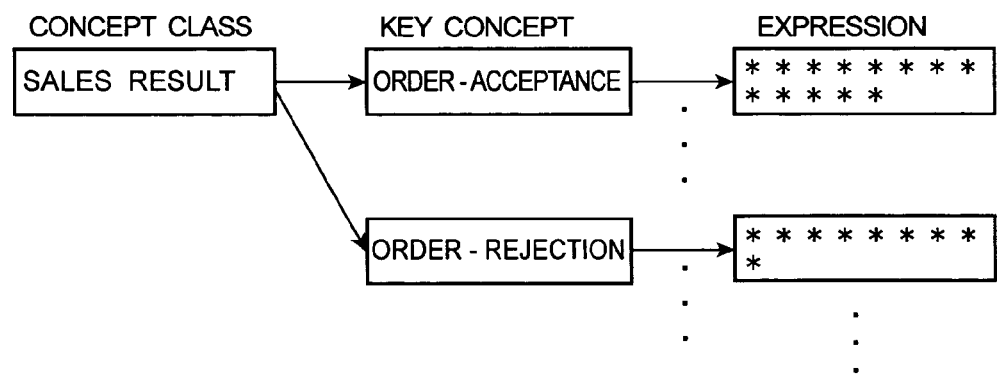
FIG. 7 is one example of background knowledge of sales result according to the first embodiment.

FIG. 7 is one example of background knowledge of sales result stored in the dictionary storage unit 101. A concept class "sales result" links to key concepts "order-acceptance" and "order-rejection" as lower nodes. Furthermore, each key concept links to expressions (characters).

Figures 8, 9:
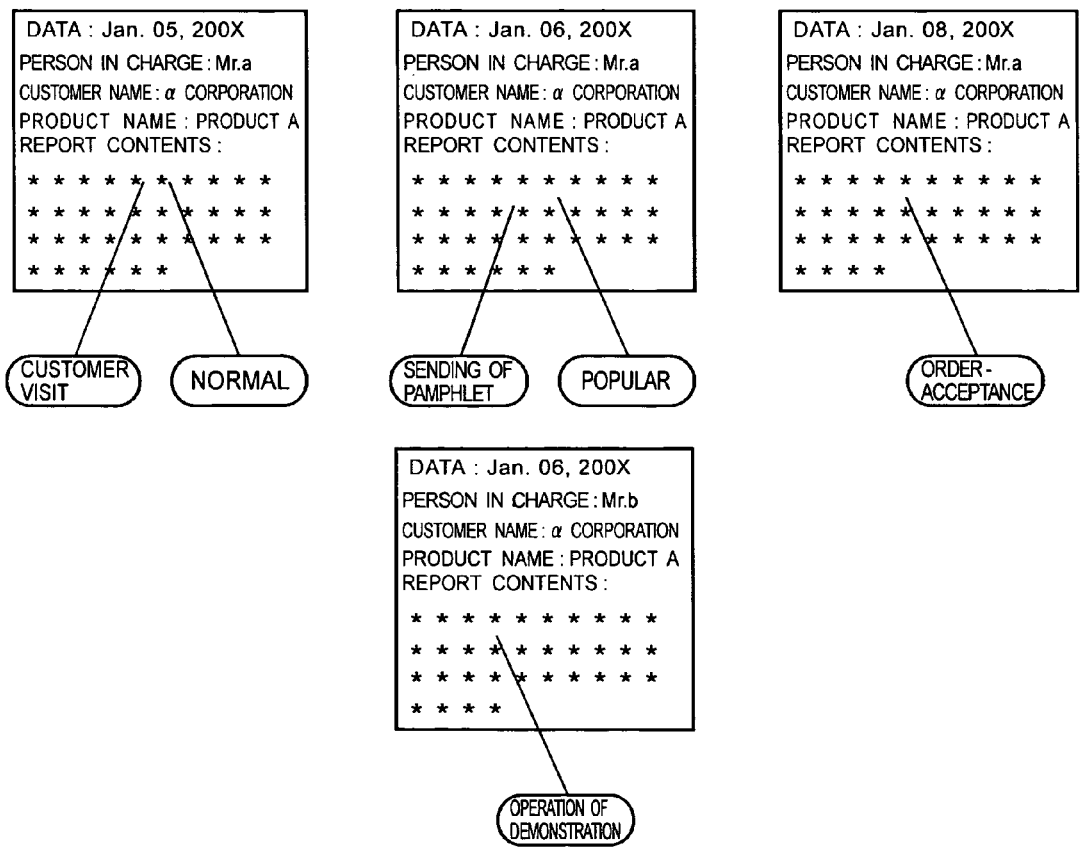
FIG. 8 is one example of text data according to the first embodiment.
FIG. 9 is one example of a group of text data and events assigned to the text data according to the first embodiment.

The text data storage unit 102 stores a set of text data including a date, a person in charge, a customer name, a product name, and report contents as shown in FIG. 8. In FIG. 8, "date" is time data, "person in charge", "customer name" and "product name" are attribute data, and "report contents" is text. These data are called the text data.

The time series data generation unit 103 extracts text data stored in the text data storage unit 102, extracts a key concept from the text data by referring to the dictionary storage unit 101, and assigns the key concept as an event to the text data.

The analysis condition indication unit 104 sends attribute data as an analysis target input by a user to the time series data generation unit 103, and sends sequential data (analysis method, analysis operation place, analysis time axis (past/present/future), sequential position, event name) as an analysis condition input by the user to the time series data analysis unit 105.

In response to the sequential data (analysis condition) input by the user through the analysis condition indication unit 104, the time series data analysis unit 105 sets the sequential data as the analysis condition, executes time series data analysis processing based on the analysis condition, and sends an analysis result to the analysis result display unit 106.

The analysis result display unit 106 displays the analysis result sent by the time series data analysis unit 105. The analysis result storage unit 107 stores the analysis result.

Figure 2:
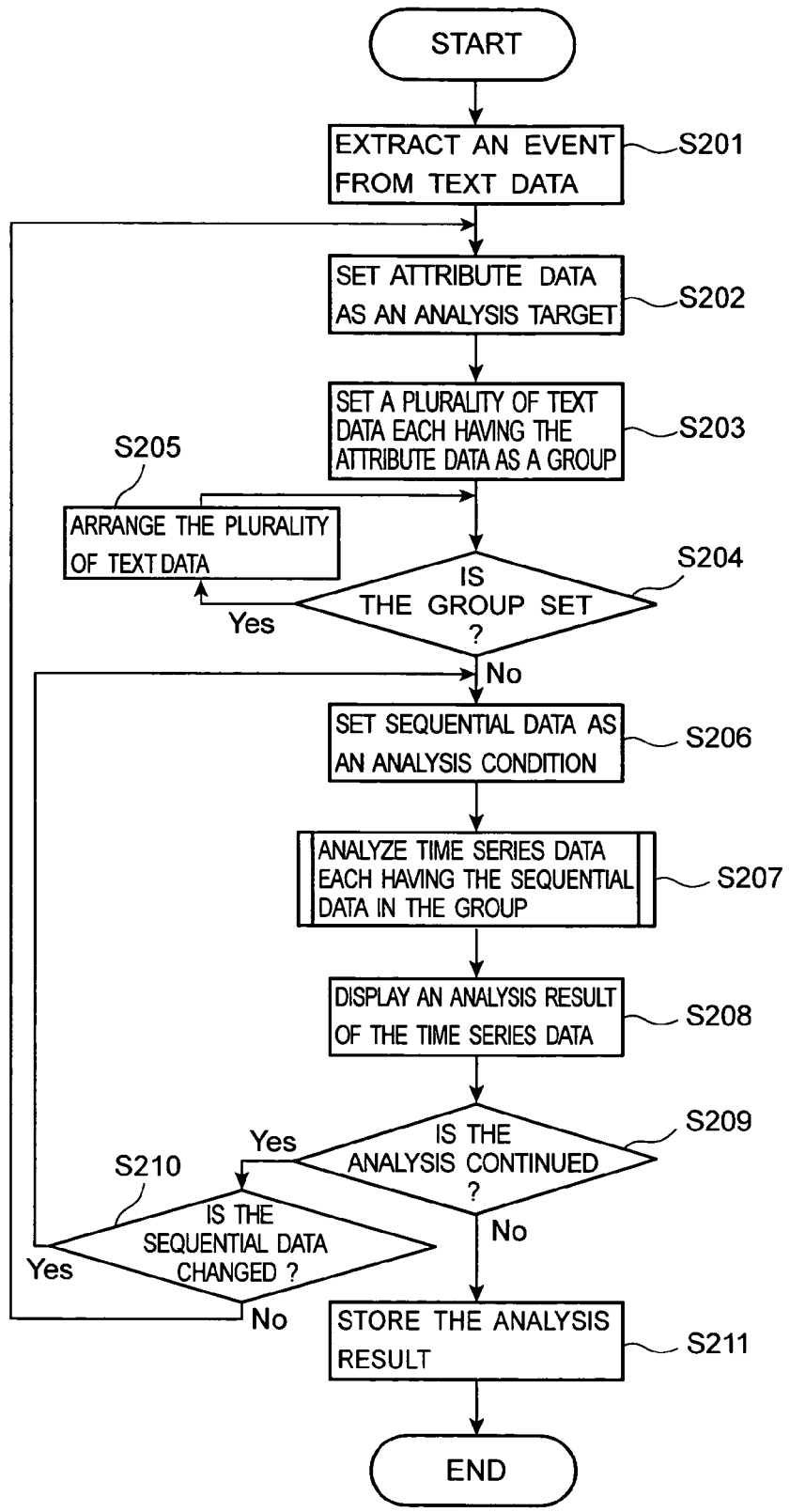
FIG. 2 is a flow chart of processing of the time series data analysis apparatus according to the first embodiment.
Figure 3:
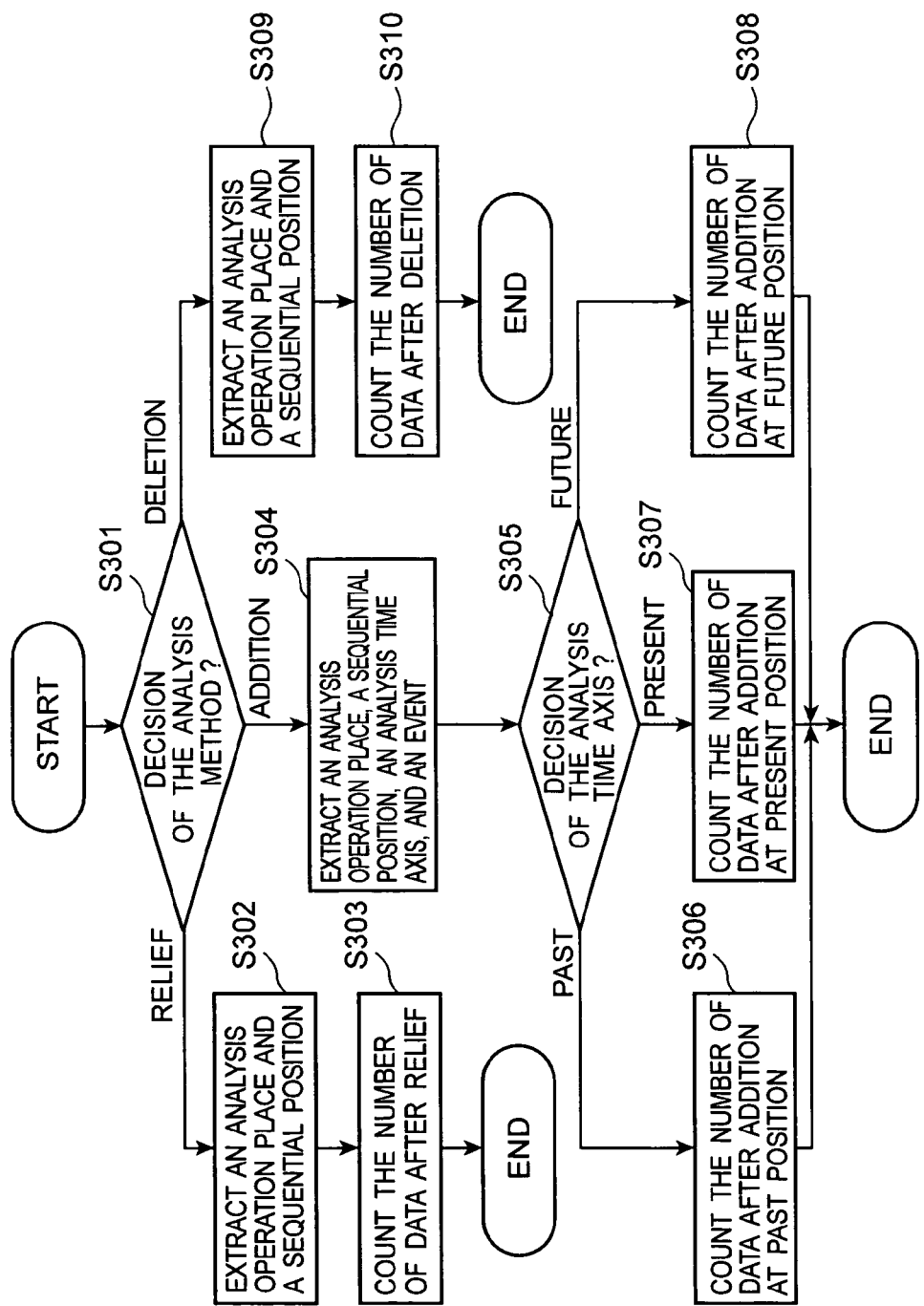
FIG. 3 is a flow chart of data analysis processing of FIG. 2 according to the first embodiment.

Next, processing of the time series data analysis apparatus is explained by referring to flow charts of FIGS. 2 and 3. FIG. 2 is a flow chart of analysis processing of the time series data analysis apparatus. At S201, the time series data generation unit 103 extracts text data stored in the text data storage unit 102 in order, and decides whether the text data includes an expression stored in the dictionary storage unit 101. If the text data includes a stored expression, the time series data generation unit 103 extracts a key concept corresponding to the expression from the dictionary storage unit 101, and assigns the key concept as an event to the text data. In this case, if the text data includes a plurality of expressions, a plurality of key concepts corresponding to the plurality of expressions is assigned to the text data.

For example, in text data of FIG. 8, "report contents" of text data includes a text "send a pamphlet". This text is matched with an expression "send a pamphlet" in FIG. 4. Accordingly, a key concept "sending of pamphlet" as an upper level concept of this expression is assigned as an event to the text data of FIG. 8. Such extraction of event is executed to each text data in order, and event assignment is executed for all text data stored in the text data storage unit 101.

At S202, the time series data generation unit 103 receives attribute data input by a user through the analysis condition indication unit 104, and sets the attribute data as an analysis target.

In the example text data of FIG. 8, three attribute data "person in charge", "customer name" and "product name" are included. At least one attribute is indicated by the user from the three attributes and set as the analysis target.

At S203, the time series data generation unit 103 sets a plurality of text data as one group based on the attribute data (set at S202).

Briefly, a plurality of text data each including the same attribute data is set as one group. For example, if "customer name" and "product name" as attribute data are indicated at S202, a plurality of text data each including the same "customer name" and the same "product name" is set as one group.

At S204, the time series data generation unit 103 extracts all text data of the group generated at S203 from the text data storage unit 102. If the group to be extracted exists, processing is forwarded to S205. If the group to be extracted does not exist, processing is forwarded to S206.

At S205, the time series data generation unit 103 arranges each text data of the group in time order based on time data ("date" in FIG. 8) of the text data extracted at S204. By extracting an event assigned to each text data arranged, the time series data generation unit 103 generates time series data as arrangement of events, and outputs the time series data to the time series data analysis unit 105.

In this case, at S205, if a plurality of text data each including the same time data (For example, the same date) exists in the group, events extracted from the plurality of text data are set as one event set.

For example, as shown in FIG. 9, if four text data each to which at least one event is included in the same group, time series data generation unit 103 generates time series data "(customer visit, normal), (sending of pamphlet, popular, operation of demonstration), order-acceptance". In this time series data, events included in parenthesis "( )" represent events that occurred at the same time (the same day), and each of these events is broken by a comma "," in order of earlier time.

At S206, the time series data analysis unit 105 receives sequential data (analysis condition) input by the user through the analysis condition indication unit 104, and sets the sequential data as the analysis condition.

In the present embodiment, as sequential data indicated as analysis condition, an analysis method (relief/addition/deletion), an analysis operation place, an analysis time axis (past/present/future), a sequential position and an event name, are input from the analysis condition indication unit 104.

The analysis method represents a modification type of analysis condition as follows.

Relief (substitution) . . . analysis by relieving (substituting) an event name in the analysis condition Addition . . . analysis by adding an event name to the analysis condition Deletion . . . analysis by deleting an event name from the analysis condition The analysis operation place represents an event sequence as an analysis object. The analysis time axis represents an additional position of an event name to the analysis operation place (event sequence) as follows.

Past . . . an event name is added to a front position of the analysis operation place Present . . . an event name is added to a sequential position of the analysis operation place Future . . . an event name is added to a back position of the analysis operation place Sequential positions represent an event position to be modified (relief, addition, deletion) in the analysis operation place (event sequence). The event name represents an event to be added to the analysis operation place.

At S207, the time series data analysis unit 105 executes time series data analysis processing, and counts the number of data (time series data) based on the analysis condition in the group.

At S208, the analysis result display unit 106 displays the number of data counted at S207. Briefly, the analysis result is presented to the user. FIGS. 10~16 represent example of the analysis result as a matrix in which the vertical axis represents attribute data ("customer name" and "product name") indicated by the user and the horizontal axis represents sequences generated (modified) from the analysis operation place (event sequence).

At S209, a control unit (not shown in FIG. 1) of the time series data analysis apparatus decides whether analysis is continued by referring to indication from the user through the analysis condition indication unit 104. In case of analysis continuation, processing is forwarded to S210. In case of non-analysis continuation, processing is forwarded to S211.

At S210, the control unit (not shown in FIG. 1) of the time series data analysis apparatus decides whether analysis condition is changed by referring to new analysis condition from the user through the analysis condition indication unit 104. In case of change of analysis condition, processing is forwarded to S206. In case of non-change of analysis condition, processing is forwarded to S202.

At S211, the number of time series data based on the analysis condition is stored in the analysis result storage unit 107 as the analysis result. For example, in case that analysis is completed at the time when the analysis result of FIG. 16 is obtained, the following analysis result is stored in the analysis result storage unit 107.

The number of data in case of "sending of pamphlet, (operation of demonstration, popular), order-acceptance" and "product A" is 15.

The number of data in case of "sending of pamphlet, (operation of demonstration, popular), order-acceptance" and "product B" is 10.

The number of data in case of "sending of pamphlet, (operation of demonstration, popular), order-acceptance" and "product C" is 8.

The number of data in case of "sending of pamphlet, (operation of demonstration, popular), order-rejection" and "product A" is 0.

The number of data in case of "sending of pamphlet, (operation of demonstration, popular), order-rejection" and "product B" is 5.

The number of data in case of "sending of pamphlet, (operation of demonstration, popular), order-rejection" and "product C" is 2.

Furthermore, at S211, a certainty degree of the analysis result is calculated by following equation (1).

$$\text{Certainty degree} = \frac{\text{(the number of data matched with the analysis condition)}}{\text{(the number of data disregarding the analysis condition)}} \quad (1)$$

If the certainty degree is above a threshold, a set of "(a) event sequence, (b) item, (c) certainty degree" is extracted as a time series rule and stored in the analysis result storage unit 107.

For example, in the example of FIG. 16, if the threshold is 0.7, certainty degree of following two sets is above 0.8.

(a) "sending of pamphlet, (operation of demonstration, popular), order-acceptance", (b) "product A", (c) certainty degree "1.0(=15/(15+0))"

(a) "sending of pamphlet, (operation of demonstration, popular), order-acceptance", (b) "product C", (c) certainty degree "0.8(=8/(8+2))"

Accordingly, these two sets are stored as time series rule in the analysis result storage unit 107.

FIG. 3 is a flow chart of time series data analysis processing at S207 in FIG. 2. At S301, in sequential data (analysis method (relief/addition/deletion), analysis operation place, analysis time axis (past/present/future), sequential position, event name) as the analysis condition set at S206, a type of analysis processing is decided by referring to the analysis method. In case of relief of analysis condition, processing is forwarded to S302. In case of addition of analysis condition, processing is forwarded to S304. In case of deletion of analysis condition, processing is forwarded to S309.

At S302, from sequential data (analysis method (relief/addition/deletion), analysis operation place, analysis time axis (past/present/future), sequential position, event name) set at S206, the analysis operation place, and the sequential position are extracted.

For example, in case of obtaining analysis result of FIG. 15, assume that a user indicates the analysis operation place "sending of pamphlet, (operation of demonstration, popular), order-acceptance" and the sequential position "order-acceptance". In this case, an event sequence "sending of pamphlet, (operation of demonstration, popular), order-acceptance" as the analysis operation place and "order-acceptance" as the sequential position are extracted. The sequential position already includes one event name "order-acceptance". Accordingly, an event name is not especially indicated.

At S303, by referring to the dictionary storage unit 101, a concept class to which the sequential position (event name) belongs is searched, and other key concepts (event names) belonging to the concept class are searched. Next, the sequential position (event name) of the analysis operation place (extracted at S302) is respectively replaced by the other key concepts. As for the analysis operation place of which the sequential position is replaced by each of the other key concepts, the number of time series data (event sequences) is respectively counted. In this case, as for the analysis operation place of which the sequential position is not replaced by the other key concepts, the number of time series data (event sequences) is already counted. Accordingly, as for the analysis operation place (not replaced), the counted data is used without new counting. In this way, the number of time series data including each analysis operation place is presented through the analysis result display unit 106.

For example, as for the analysis result of FIG. 15, assume that the analysis operation place "sending of pamphlet, (operation of demonstration, popular), order-acceptance" and the sequential position "order-acceptance" are extracted. In this case, as an upper level concept of the key concept (sequential position) "order-acceptance", a concept class "sales result" is searched from the dictionary storage unit 101 as shown in FIG. 7. Furthermore, except for the key concept "order-acceptance", the concept class "sales result" links to another key concept "order-rejection" as a lower level concept as shown in FIG. 7. Accordingly, the number of time series data (event sequence) each including "sending of pamphlet, (operation of demonstration, popular), order-rejection" is counted.

On the other hand, as shown in FIG. 15, the number of time series data (event sequence) each including "sending of pamphlet, (operation of demonstration, popular), order-acceptance" is already counted. Accordingly, the counted data in FIG. 15 is used without new counting. In this way, the analysis result as the number of data is sent to the analysis result display unit 106.

Accordingly, in case of displaying this analysis result through the analysis result display unit 106, the analysis result shown in FIG. 16 is displayed. In the example of FIG. 16, the analysis result is displayed as a matrix in which the vertical axis represents the attribute data (analysis target) "customer name" and "product name", and the horizontal axis represents two event sequences based on the analysis condition.

At S304, from sequential data (analysis method (relief/addition/deletion), analysis operation place, analysis time axis (past/present/future), sequential position, event name) set at S206, the analysis operation place, the analysis time axis, the sequential position, and the event name are extracted.

At S305, the analysis time axis extracted at S304 is decided. In case of the analysis time axis "past", processing is forwarded to S306. In case of the analysis time axis "present", processing is forwarded to S307. In case of the analysis time axis "future", processing is forwarded to S308.

At S306, if the event name is indicated as a key concept, the key concept is added to a front position of the analysis operation place (event sequence) because the analysis time axis is "past". In this case, if the event name is indicated as a concept class, a key concept belonging to the concept class is searched from the dictionary storage unit 101 and the key concept is added to the front position of the analysis operation place. In both cases, the number of time series data each including the analysis operation place to which the key concept is added is counted and sent to the analysis result display unit 106.

For example, in FIG. 14, in case of the analysis operation place "(operation of demonstration, popular), order-acceptance", the event name "customer behavior" and the analysis time axis "past", three key concepts "sending of pamphlet", "request for lower price" and "inquiry of spec" as lower level concepts of the concept class "customer behavior" are searched from the dictionary storage unit 101 as shown in FIG. 4, and respectively added to a front position of the analysis operation place. The number of time series data each including the analysis operation place to which each key concept is added is respectively counted and sent to the analysis result display unit 106. Accordingly, this analysis result is displayed by the analysis result display unit 106 as shown in FIG. 15.

At S307, if the event name is indicated as a key concept, the key concept is added to the sequential position (event position) of the analysis operation place (event sequence) because the analysis time axis is "present". In this case, if the event name is indicated as a concept class, a key concept belonging to the concept class is searched from the dictionary storage unit 101 and the key concept is added to the sequential position of the analysis operation place. In both cases, the number of time series data each including the analysis operation place to which the key concept is added is counted and sent to the analysis result display unit 106.

For example, in FIG. 10, in case of the analysis operation place "(operation of demonstration, popular)", the sequential position "(operation of demonstration)", the event name "customer reaction" and the analysis time axis "present", key concepts "popular", "normal" and "unpopular" as lower level concepts of the concept class "customer reaction" are searched from the dictionary storage unit 101 as shown in FIG. 6, and respectively added to the sequential position of the analysis operation place. As a result, three sequential data "(operation of demonstration, popular)", "(operation of demonstration, normal)" and "(operation of demonstration, unpopular)" are generated. The number of time series data each including one of the three sequential data is respectively counted and sent to the analysis result display unit 106. Accordingly, this analysis result is displayed by the analysis result display unit 106 as shown in FIG. 11.

Furthermore, in FIG. 10, in case of the analysis operation place "business behavior", the sequential position "business behavior", the event name "customer reaction" and the analysis time axis "present", key concepts "popular", "normal" and "unpopular" as lower level concepts of the concept class "customer reaction" are searched from the dictionary storage unit 101 as shown in FIG. 6, and respectively added to the sequential position of the analysis operation place. As a result, twelve sequential data "(customer visit, popular)", "(customer visit, normal)", "(customer visit, unpopular)", "(operation of demonstration, popular)", "(operation of demonstration, normal)", "(operation of demonstration, unpopular)", "(presentation of estimate, popular)", "(presentation of estimate, normal)", "(presentation of estimate, unpopular)", "(unofficial decision, popular)", "(unofficial decision, normal)" and "(unofficial decision, unpopular)" are generated. The number of time series data each including one of the twelve sequential data is respectively counted and sent to the analysis result display unit 106. Accordingly, this analysis result is displayed by the analysis result display unit 106 as shown in FIG. 12.

At S308, if the event name is indicated as a key concept, the key concept is added to a back position of the analysis operation place (event sequence) because the analysis time axis is "future". In this case, if the event name is indicated as a concept class, a key concept belonging to the concept class is searched from the dictionary storage unit 101 and the key concept is added to the back position of the analysis operation place. In both cases, the number of time series data each including the analysis operation place to which the key concept is added is counted and sent to the analysis result display unit 106.

For example, in FIG. 11, in case of the analysis operation place "(operation of demonstration, popular), order-acceptance", the event name "sales result" and the analysis time axis "future", two key concepts "order-acceptance" and "order-rejection" as lower level concepts of the concept class "sales result" are searched from the dictionary storage unit 101 as shown in FIG. 7, and respectively added to a back position of the analysis operation place. The number of time series data each including the analysis operation place to which each key concept is added is respectively counted and sent to the analysis result display unit 106. Accordingly, this analysis result is displayed by the analysis result display unit 106 as shown in FIG. 14.

At S309, from sequential data (analysis method (relief/addition/deletion), analysis operation place, analysis time axis (past/present/future), sequential position, event name) set at S206, the analysis operation place and the sequential position are extracted.

For example, in case of obtaining analysis result of FIG. 11, assume that a user indicates the analysis operation place "(operation of demonstration, customer reaction)" and the sequential position "operation of demonstration". In this case, an event sequence "(operation of demonstration, customer reaction)" as the analysis operation place and "operation of demonstration" as the sequential position are extracted.

At S310, an event of the sequential position (extracted at S309) is deleted from the analysis operation place (extracted at S309). In this case, if the event of the sequential position is a concept class, all key concepts belonging to the concept class are searched from the dictionary storage unit 101, and each key concept belonging to the concept class is respectively deleted from the sequential position of the analysis operation place. If the event of the sequential position is a key concept, the key concept of the sequential position is deleted from the analysis operation place. In both cases, the number of time series data each including the analysis operation place from which the key concept is deleted is counted and sent to the analysis result display unit 106.

For example, in case of obtaining the analysis result of FIG. 11, assume that the analysis operation place "(operation of demonstration, customer reaction)" and the sequential position "operation of demonstration" are extracted. In this case, if a user indicates a key concept "operation of demonstration" as a deletion event, the key concept "operation of demonstration" is deleted from the analysis operation place. As a result, three events "popular", "normal" and "unpopular" are generated. The number of time series data each including one of the three events is respectively counted and sent to the analysis result display unit 106. Accordingly, the analysis result is displayed by the analysis result display unit 106 as shown in FIG. 13.

As mentioned-above, in the first embodiment, text data is analyzed based on the user's indication input through the analysis condition indication unit. This analysis result is interactively presented to the user through the analysis result display unit. Accordingly, characteristic time series pattern can be quickly detected without omission.

Figure 17:
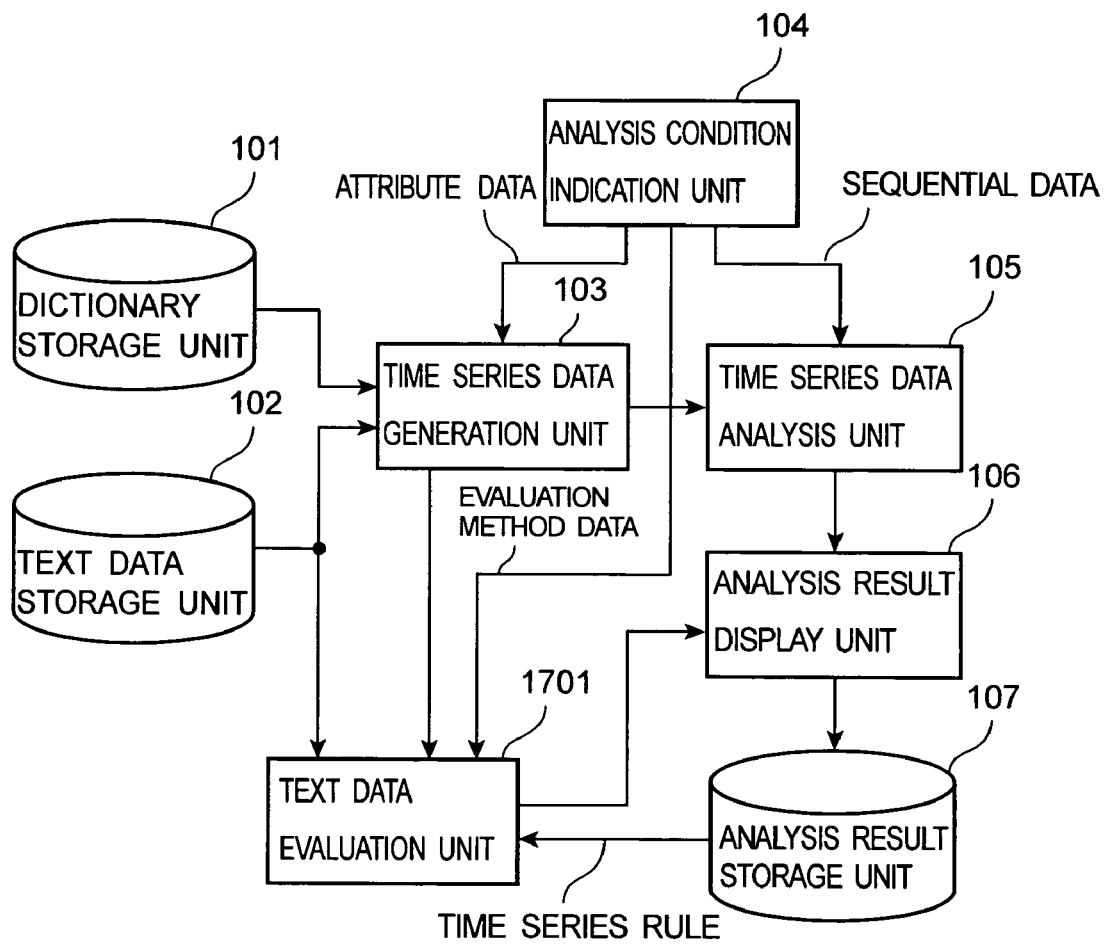
FIG. 17 is a block diagram of a time series data analysis apparatus according to a second embodiment.

FIG. 17 is a block diagram of the time series data analysis apparatus according to a second embodiment. In FIG. 17, as for same units as FIG. 1, the same number is assigned and its explanation is omitted. In comparison with component of FIG. 1, a text data evaluation unit 1701 is added in FIG. 17.

In FIG. 17, the analysis condition indication unit 104 sends evaluation method data and event data (both input by a user) to the text data evaluation unit 1701. The evaluation method data represents "measure presentation" or "future prediction". The event data represents a target for "measure presentation". In response to the evaluation method data input from the user through the analysis condition indication unit 104, the text data evaluation unit 1701 evaluates text data stored in the text data storage unit 102 based on the evaluation method data, and sends the evaluation result to the analysis result display unit 106.

The analysis result storage unit 107 sends time series rules to the text data evaluation unit 1701. It often happens that a user wants to watch time series data (or text data) from which the time series rule was extracted. In this case, the text data evaluation unit 1701 detects the time series data (or text data) from which the time series rule was generated by referring to the time series rule stored in the time series data generation unit 103, and displays the time series data (or text data) with the time series rule through the analysis result display unit 106. In this way, the user can watch original data from which the time series rule was extracted.

Figure 18:
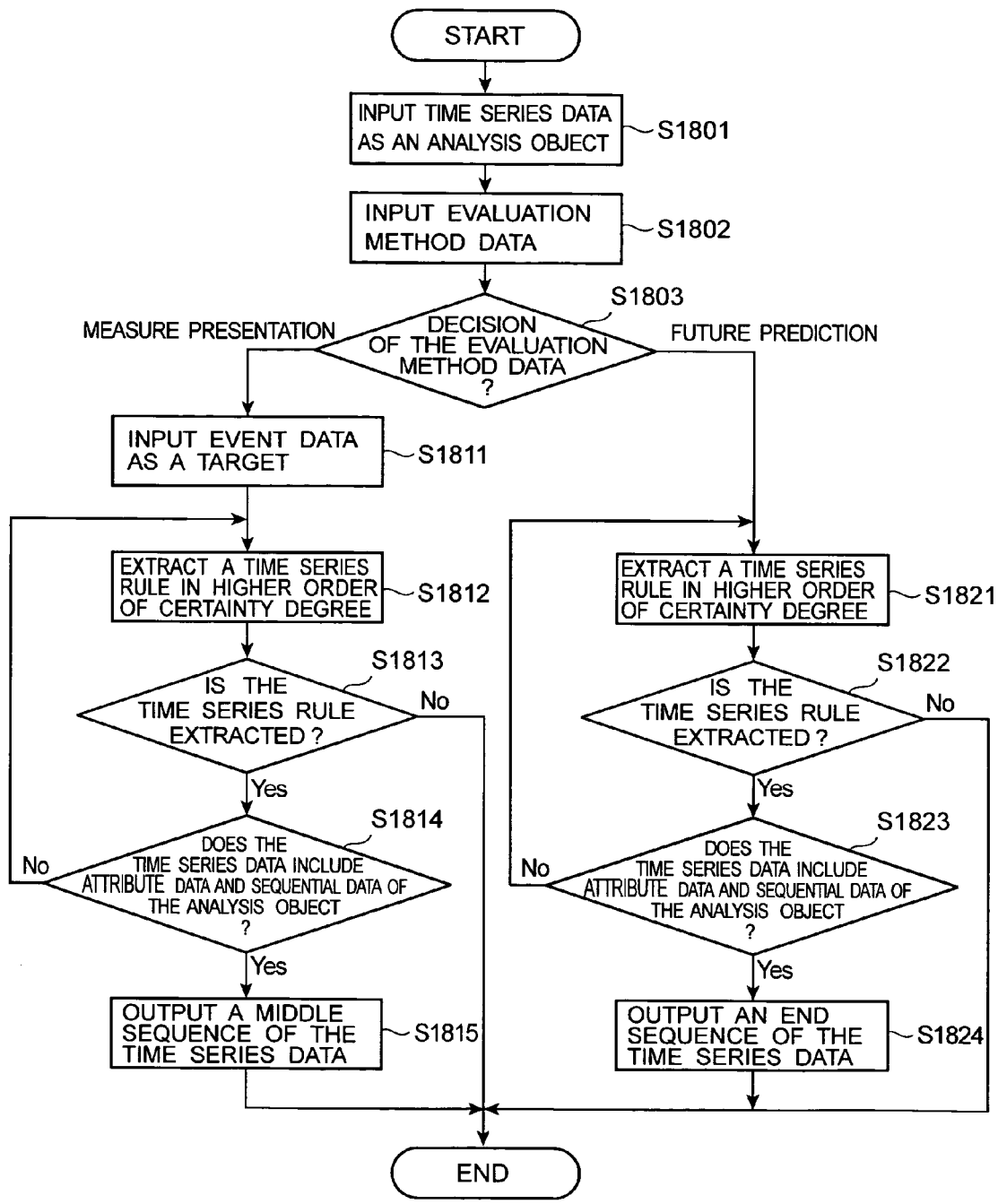
FIG. 18 is a flow chart of processing of the time series data analysis apparatus according to the second embodiment.

Next, processing of the time series data analysis apparatus of the second embodiment is explained by referring to the flow chart of FIG. 18. In FIG. 18, analysis steps of time series data are the same as in the first embodiment and its explanation is omitted. In the second embodiment, in case of inputting new text data as an analysis object, steps of future prediction and steps of measure presentation to realize a target are different from the first embodiment. Accordingly, only these different steps are explained.

As for time series data as the analysis object, time series data may be generated from new text data provided or the time series data as the analysis object may be input from the user through the analysis condition indication unit 104. As for a method for generating time series data from new text data provided, a generation method explained in the first embodiment is used.

In the following explanation, assume that a user directly inputs time series data as the analysis object through the analysis condition indication unit 104. In this example, the time series data as the analysis object includes attribute data as an analysis target. However, the time series data as the analysis object may not include attribute data. In this case, attribute data is set as anything.

At S1801, time series data as the analysis object is input by a user through the analysis condition indication unit 104. At S1802, evaluation method data is input by the user through analysis condition indication unit 104. At S1803, it is decided whether the evaluation method data is "measure presentation" or "future prediction". In case of "measure presentation", processing is forwarded to S1811. In case of "future prediction", processing is forwarded to S1821.

At S1811, event data as a target is input by the user through the analysis condition indication unit 104. At S1812, time series rules each of which event of last position is the same as the target are detected from the analysis result storage unit 107, and each time series rule is extracted in higher order of certainty degree from the detected time series rules.

At S1813, it is decided whether time series rules to be extracted exist. If the time series rules exist, processing is forwarded to S1814. If the time series rules do not exist, it is decided that a measure presentation for the time series data as the analysis object is failed and processing is completed.

At S1814, it is decided whether item data of the time series rule (extracted at S1812) is the same as item data of the time series data of the analysis object and whether sequential data of the time series rule excluding the event of the last position includes the time series data of the analysis object. If these two conditions are satisfied, processing is forwarded to S1815. If at least one of these two conditions is not satisfied, processing is forwarded to S1812.

For example, assume that a time series rule [(a) "sending of pamphlet, (operation of demonstration, popular), order-acceptance", (b) "product A", (c) certainty degree "1.0"] is extracted from the analysis result storage unit 107. If item data of the analysis object is "product A", if sequential data of the analysis object is "sending of pamphlet", and if a target is "order-acceptance", it is decided that two conditions are satisfied and processing is forwarded to S1815.

At S1815, sequential data of the analysis object and an event of the last position are excluded from the time series rule (decided that two conditions are satisfied at S1814). Briefly, a middle sequence (remained event sequence) is extracted from the time series rule and sent to the analysis result display unit 106. The analysis result display unit 106 displays the middle sequence as a measure presentation result and processing is completed.

Figure 19:
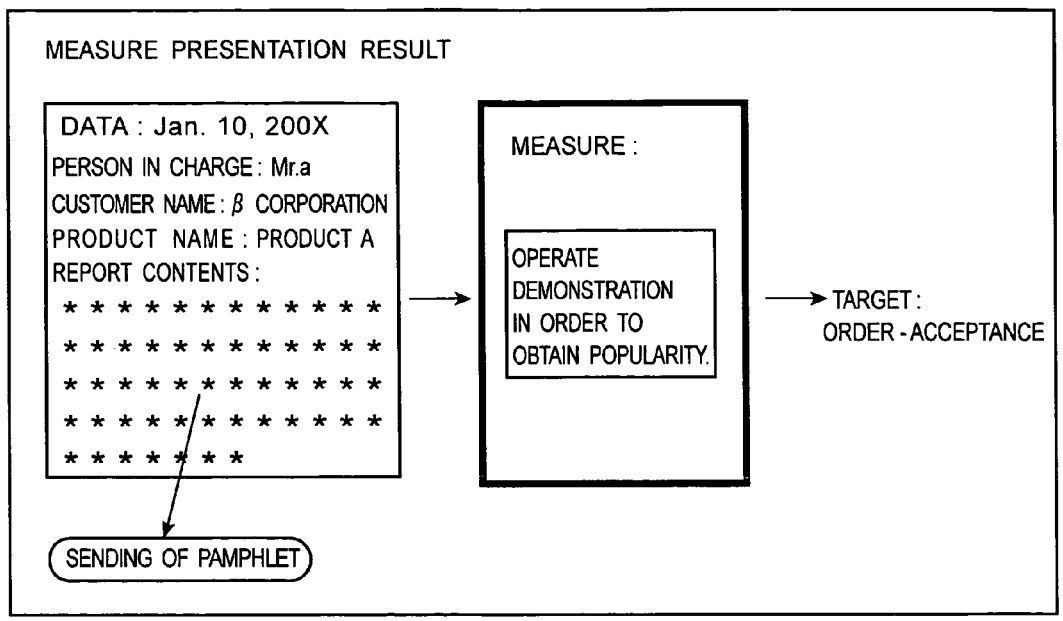
FIG. 19 is one example of a measure presentation result of the time series data analysis apparatus according to the second embodiment.

For example, assume that a time series rule is [(a) "sending of pamphlet, (operation of demonstration, popular), order-acceptance", (b) "product A", (c) certainty degree "1.0"], time series data as an analysis object is "sending of pamphlet" and a target is "order-acceptance". In this case, a middle sequence "(operation of demonstration, popular)" is extracted from the time series rule and displayed as the measure presentation result to the user through the analysis result display unit 106 as shown in FIG. 19.

At S1821, time series rules are extracted in higher order of certainty degree from the analysis result storage unit 107. At S1822, it is decided whether time series rules to be extracted exist. If the time series rules exist, processing is forwarded to S1823. If the time series rules do not exist, it is decided that future prediction of the analysis object has failed and processing is completed.

At S1823, it is decided whether item data of the time series rule (extracted at S1821) is the same as item data of the analysis object and whether sequential data of the time series rule includes the time series data of the analysis object. If these two conditions are satisfied, processing is forwarded to S1824. If at least one of these two conditions is not satisfied, processing is forwarded to S1821.

At S1824, the time series data of the analysis object is excluded from the time series rule. Briefly, an end sequence (remained event sequence) is extracted from the time series rule and sent to the analysis result display unit 106. The analysis result display unit 106 displays the end sequence as a future prediction result and processing is completed.

Figure 20:
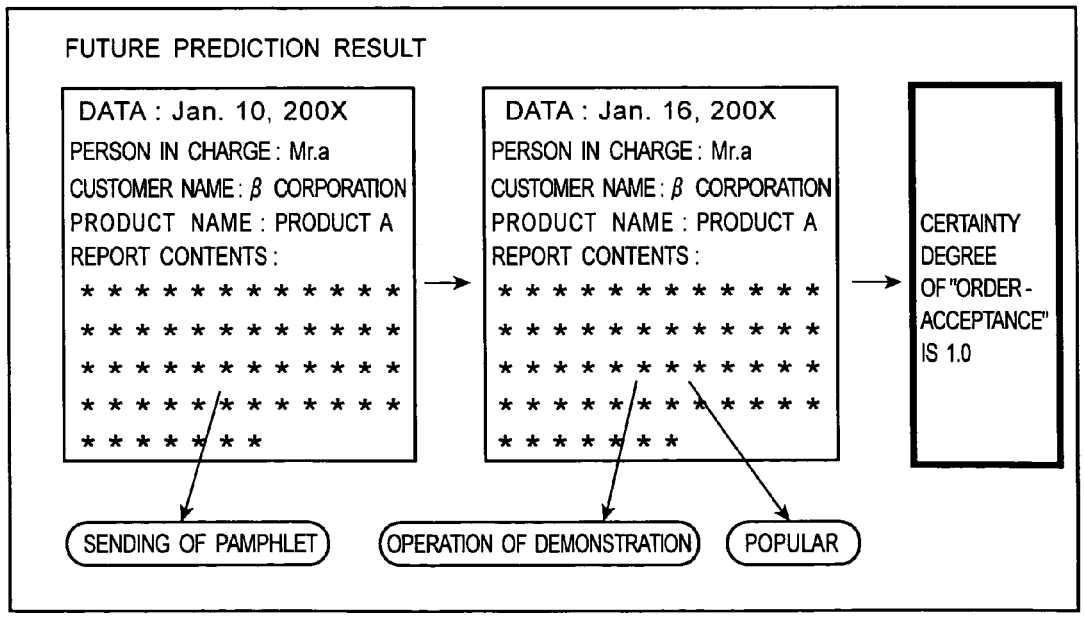
FIG. 20 is one example of a future prediction result of the time series data analysis apparatus according to the second embodiment.

For example, assume that a time series rule is [(a) "sending of pamphlet, (operation of demonstration, popular), order-acceptance", (b) "product A", (c) certainty degree "1.0"] and time series data as an analysis object is "sending of pamphlet, (operation of demonstration, popular)". In this case, an end sequence "order-acceptance" is extracted from the time series rule and displayed as the future prediction result to the user through the analysis result display unit 106 as shown in FIG. 20.

As mentioned-above, in the second embodiment, characteristic analysis result is stored as a time series rule. In case of inputting new text data as an analysis object, a future event of the new text data is predicted or a measure to guide a target event of the new text data is presented. Accordingly, the user's decision making can be supported. Furthermore, the time series rule can be interactively found by the user's operation.

In the above embodiments, the analysis object is set as one sequential data. However, a plurality of sequential data may be the analysis object. Furthermore, in the above embodiments, in case of displaying the analysis result, the vertical axis represents attributes (analysis target) and the horizontal axis represents indicated sequences (analysis condition). However, both the vertical axis and the horizontal axis may be attributes or sequences. In this case, axes are set in three dimensional spaces. Furthermore, in the above embodiments, the analysis result is displayed as a matrix. However, the analysis result may be represented as a bar graph of which the vertical axis is the number of data.

In the above embodiments, a dictionary to extract events from text data has a three level hierarchical structure. However, the dictionary having at least a four level hierarchical structure may be used. Furthermore, in above embodiments, in case of extracting events from text data, the event is extracted by completely matching with expressions of characters. However, by morphologically analyzing text data, the event may be extracted based on a regular expression.

In the above embodiments, time series rules are extracted from the last analysis result when a user does not further indicate a new analysis condition (or a new analysis target). However, whenever the analysis result display changes based on a change of the analysis condition, time series rules of high certainty degree may be extracted.

Instead of automatic extraction of time series rules based on an evaluation criterion, the user may select time series rules through the analysis condition indication unit 104. Furthermore, as a decision criterion of time series rules, the evaluation criterion except for the certainty degree, for example, a length of sequential data or a ratio of inclusion of the indicated event may be used. In the above embodiments, in case of future prediction or measure presentation, one prediction or one measure is presented as a result. However, a plurality of results may be presented with certainty degrees.

Figure 21:
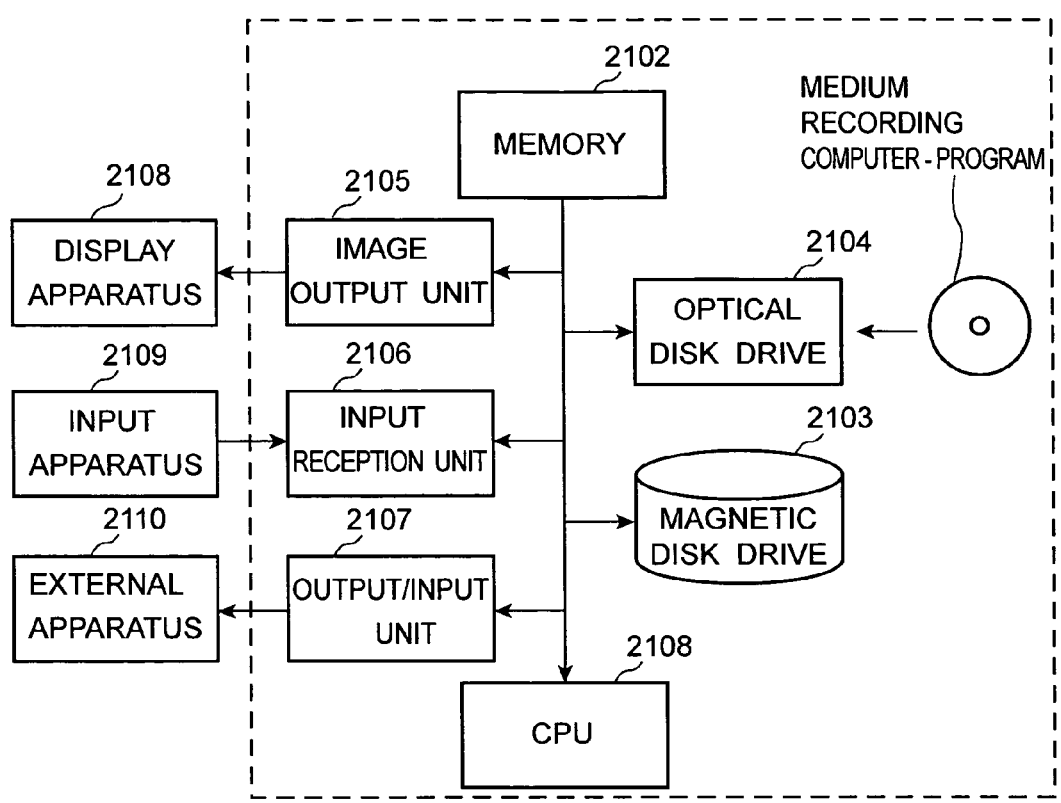
FIG. 21 is a block diagram of computer components to operate function of the time series data analysis apparatus according to the embodiments.

The present invention may be realized as a program operated by a computer such as a work station (WS) or a personal computer (PC). FIG. 21 is a block diagram of the computer.

In this computer, a central processing unit (CPU) 2101 executes a program. A memory 2102 stores the program and data processed by the program. A magnetic disk drive 2103 stores the program, data as a retrieval object, and OS (Operating System). An optical disk drive 2104 reads and writes the program and data from/to an optical disk.

Furthermore, an image output unit 2105 is an interface to display on a screen of a display apparatus. An input reception unit 210 receives input from a keyboard, a mouse or a touch panel. An output/input unit 2107 is an interface to/from an external apparatus (For example, USB (Universal Serial Bus), or a speech output terminal).

Furthermore, a display apparatus 2108 is, for example, an LCD, a CRT, or a projector. An input apparatus 2109 is, for example, a keyboard or a mouse. An external apparatus 2110 is, for example, a memory card reader or a speaker.

The CPU 2101 reads the program from the magnetic disk drive 2108, and executes the program after storing in the memory 2102. A part or all of retrieval object data may be read from the magnetic disk drive 2103 and stored in the memory 2102 while executing the program.

As a basic operation of the CPU 2101, in response to a retrieval request from a user through the input apparatus 2109, retrieval object data is retrieved from the magnetic disk drive 2103 or the memory 2102 based on the retrieval request. The retrieval result is displayed through the display apparatus 2108.

In addition to displaying the retrieval result though the display apparatus 2108, the retrieval result may be presented using speech to a user by connecting with a speaker as the external apparatus 2110. Alternatively, the retrieval result may be output as a printed matter by connecting with a printer as the external apparatus 2110.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for analyzing time series data, comprising:
a text data storage unit configured to store a plurality of text data, each text data having attribute data and time data, the attribute data being predetermined items;
a dictionary storage unit configured to hierarchically store a concept class as the highest node, a key concept as an event, and expressions of text data as the lowest node;
an analysis condition indication unit configured to indicate an analysis target as attribute data and an analysis condition as an event sequence;
a time series data generation unit configured to extract characters matched with an expression stored in the dictionary storage unit from each of the plurality of text data, to assign the event to which the expression belongs, to the text data including the characters, to extract a group of text data each having the same attribute data as the analysis target from the plurality of text data, and to generate time series data each representing the event assigned to the text data of the group in order of the time data of the text data;
a time series data analysis unit configured to count the number of the time series data each having the same event sequence as the analysis condition for each group; and
an analysis result output unit configured to output the number of the time series data for each group as an analysis result of said time series data analysis unit.

2. The apparatus according to claim 1, wherein said analysis condition indication unit indicates an analysis method as a modification type of the event sequence, an analysis operation place as the event sequence to be modified, an analysis time axis as an additional position of an event, a sequential position as a modification position in the event sequence to be modified, and an event name as the event to be added.

3. The apparatus according to claim 2,
wherein, if the analysis method is relief, said time series data analysis unit counts the number of time series data each including the analysis operation place from the group, replaces the event of the sequential position in the analysis operation place by another event belonging to the concept class including the event, and counts the number of time series data each including the analysis operation place replaced by another event from the group.

4. The apparatus according to claim 2,
wherein, if the analysis method is deletion, said time series data analysis unit deletes the event of the sequential position in the analysis operation place, and counts the number of time series data each including the analysis operation place without the event from the group.

5. The apparatus according to claim 2,
wherein, if the analysis method is addition and the analysis time axis is past, said time series data analysis unit adds the event name to a front position of the analysis operation place, and counts the number of time series data each including the analysis operation place with the event name at the front position.

6. The apparatus according to claim 2,
wherein, if the analysis method is addition and the analysis time axis is present, said time series data analysis unit adds the event name to the sequential position of the analysis operation place, and counts the number of time series data each including the analysis operation place with the event name at the sequential position.

7. The apparatus according to claim 2,
wherein, if the analysis method is addition and the analysis time axis is future, said time series data analysis unit adds the event name to a back position of the analysis operation place, and counts the number of time series data each including the analysis operation place with the event name at the back position.

8. The apparatus according to claim 2,
wherein, after said analysis result output unit outputs the analysis result, said analysis condition indication unit indicates at least one of another analysis condition and another analysis target for analysis continuation.

9. The apparatus according to claim 8,
further comprising an analysis result storage unit configured to store the analysis result when said analysis condition indication unit does not indicate the analysis continuation.

10. The apparatus according to claim 9,
wherein said time series data analysis unit counts the first number of time series data each having the same event sequence as the analysis condition from the group, counts the second number of time series data each having the same event sequence without the modification position from the group, calculates a ratio of the first number to the second number as a certainty degree, and decides whether the certainty degree is above a threshold.

11. The apparatus according to claim 10,
wherein, if the certainty degree is above the threshold, said time series data analysis unit extracts the event sequence and the attribute data from the time series data, and
wherein said analysis result storage unit stores the event sequence, the attribute data and the certainty degree as a time series rule.

12. The apparatus according to claim 11,
wherein said analysis condition indication unit indicates an evaluation method data as a measure presentation or a future prediction, and indicates an event as a target if the evaluation method data is the measure presentation.

13. The apparatus according to claim 12,
further comprising a text data evaluation unit configured to extract the time series rule including the target at a last position of the event sequence in higher order of the certainty degree from said analysis result storage unit if the evaluation method data is the measure presentation.

14. The apparatus according to claim 13,
wherein, when said text data storage unit stores new text data as an analysis object, said text data evaluation unit decides whether the time series rule includes attribute data of the new text data and whether the time series rule without the target includes an event sequence of the new text data, and, if the time series rule includes the attribute data and the event sequence, extracts the time series rule without the attribute data, the target and the event sequence as a measure presentation result.

15. The apparatus according to claim 12,
wherein, if the evaluation method data is the future prediction, said text data evaluation unit extracts the time series rule in higher order of the certainty degree from said analysis result storage unit.

16. The apparatus according to claim 15,
wherein, when said text data storage unit stores new text data as an analysis object, said text data evaluation unit decides whether the time series rule includes attribute data and an event sequence of the new text data, and, if the time series rule includes the attribute data and the event sequence, extracts the time series rule without the attribute data and the event sequence as a future prediction result.

17. A method for analyzing time series data, comprising:
storing a plurality of text data, each text data having attribute data and time data in a text data storage unit, the attribute data being predetermined items;
hierarchically storing a concept class as the highest node, a key concept as an event, and expressions of text data as the lowest node in a dictionary storage unit;
indicating an analysis target as attribute data and an analysis condition as an event sequence;
extracting characters matched with an expression stored in the dictionary storage unit from each of the plurality of text data;
assigning the event to which the expression belongs to the text data including the characters;
extracting a group of text data each having the same attribute data as the analysis target from the plurality of text data;
generating time series data each representing the event assigned to the text data of the group in order of the time data of the text data;
counting the number of the time series data each having the same event sequence as the analysis condition for each group; and
outputting the number of the time series data for each group.

18. A computer program product, comprising:
a computer readable program code embodied in said product for causing a computer to analyze time series data, said computer readable program code comprising:
a first program code to store a plurality of text data, each text data having attribute data and time data in a text data storage unit, the attribute data being predetermined items;
a second program code to hierarchically store a concept class as the highest node, a key concept as an event, and expressions of text data as the lowest node in a dictionary storage unit;
a third program code to indicate an analysis target as attribute data and an analysis condition as an event sequence;
a fourth program code to extract characters matched with an expression stored in the dictionary storage unit from each of the plurality of text data;
a fifth program code to assign the event to which the expression belongs, to the text data including the characters;
a sixth program code to extract a group of text data each having the same attribute data as the analysis target from the plurality of text data;
a seventh program code to generate time series data each representing the event assigned to the text data of the group in order of the time data of the text data;
an eighth program code to count the number of the time series data each having the same event sequence as the analysis condition for each group; and
a ninth program code to output the number of the time series data for each group.

* * * * *